United States Patent
Seo et al.

(10) Patent No.: US 11,867,418 B2
(45) Date of Patent: Jan. 9, 2024

(54) AIR CONDITIONING SYSTEM AND METHOD FOR CONTROLLING AIR CONDITIONING SYSTEM

(71) Applicant: LG ELECTRONICS INC., Seoul (KR)

(72) Inventors: Beomsoo Seo, Seoul (KR); Sounghun Lee, Seoul (KR); Youngheon Kwon, Seoul (KR); Pilhyun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 17/241,260

(22) Filed: Apr. 27, 2021

(65) Prior Publication Data

US 2021/0348773 A1 Nov. 11, 2021

(30) Foreign Application Priority Data

May 6, 2020 (KR) ........................ 10-2020-0053688

(51) Int. Cl.
*F24D 19/10* (2006.01)
*F24D 5/12* (2006.01)
*F24F 11/50* (2018.01)

(52) U.S. Cl.
CPC ................ *F24F 11/50* (2018.01); *F24D 5/12* (2013.01); *F24D 2200/32* (2013.01); *F24D 2240/10* (2013.01)

(58) Field of Classification Search
CPC .... F24D 5/12; F24D 19/1087; F24D 2200/32; F24D 2240/10; F24F 11/65; F24F 11/50; F24F 2110/10; Y02B 30/13
See application file for complete search history.

(56) References Cited

U.S. PATENT DOCUMENTS

2010/0065245 A1 3/2010 Imada et al.
2010/0070093 A1 3/2010 Harrod et al.
(Continued)

FOREIGN PATENT DOCUMENTS

CA 2791973 4/2013
CN 103900103 7/2014
(Continued)

OTHER PUBLICATIONS

German Office Action issued in Application No. 102021204115.9 dated Jan. 17, 2022.
(Continued)

*Primary Examiner* — Frantz F Jules
*Assistant Examiner* — Martha Tadesse
(74) *Attorney, Agent, or Firm* — KED & ASSOCIATES, LLP (57) ABSTRACT

An air conditioning system having an auxiliary heat source is provided and that may include an outdoor unit, an indoor heat exchanger connected to the outdoor unit, the indoor heat exchanger including a temperature sensor, an auxiliary heat source arranged as an auxiliary to the outdoor unit and operated by an energy source different from an energy source of the outdoor unit, a thermostat configured to control a temperature of an installation space supplied with cold air or warm air by the outdoor unit and the auxiliary heat source, and a communicator. The communicator may include an input unit connected to the thermostat, a first output unit connected to the auxiliary heat source, a second output unit connected to the outdoor unit, and a controller configured to process signals between the input unit, the first output unit, and the second output unit.

18 Claims, 10 Drawing Sheets

(56) References Cited

U.S. PATENT DOCUMENTS

| | | | |
|---|---|---|---|
| 2010/0106319 A1* | 4/2010 | Grohman | F24F 11/30 |
| | | | 700/276 |
| 2012/0042673 A1* | 2/2012 | Noh | F24D 19/1063 |
| | | | 62/159 |
| 2014/0252100 A1 | 9/2014 | Branson et al. | |
| 2015/0219342 A1* | 8/2015 | Yoh | F24D 11/0271 |
| | | | 126/116 A |
| 2016/0341434 A1* | 11/2016 | Kojima | F24H 15/421 |
| 2019/0003734 A1 | 1/2019 | Costa et al. | |
| 2019/0195523 A1* | 6/2019 | Mowris | G05D 23/1951 |

FOREIGN PATENT DOCUMENTS

| | | |
|---|---|---|
| CN | 105074344 | 11/2015 |
| EP | 0 042 958 | 1/1982 |
| EP | 2 420 747 | 2/2012 |
| EP | 3 096 091 | 11/2016 |
| JP | 2015-145765 | 8/2015 |
| KR | 10-2010-0064144 | 6/2010 |
| KR | 10-2012-0021777 | 3/2012 |
| WO | WO 2015/115404 | 8/2015 |

OTHER PUBLICATIONS

Chinese Office Action dated Jul. 5, 2022 issued in Application No. 202110468708.X.
International Search Report dated Jan. 29, 2021.

\* cited by examiner

AIR CONDITIONING SYSTEM AND METHOD FOR CONTROLLING AIR CONDITIONING SYSTEM

CROSS-REFERENCE TO RELATED APPLICATION(S)

This application claims the benefit of Korean Patent Application No. 10-2020-0053688, filed in Korea on May 6, 2020, which is hereby incorporated by reference as if fully set forth herein.

BACKGROUND

1. Field

An air conditioning system and a method for controlling an air conditioning system are disclosed herein.

2. Background

In general, a unitary system, a type of air conditioning system that is widely used in residential spaces in North America, includes a thermostat (a temperature control device), an outdoor unit (for cooling or cooling/heating), a gas furnace (for air blowing or heating), and an indoor heat exchanger (an A-coil). In the unitary system, the outdoor unit installed outdoors provides cooling or cooling/heating of rooms, and the indoor heat exchanger and the gas furnace are installed indoors in a basement or on a ceiling to transport processed air to an indoor residential space through an air passage called a duct.

The unitary system is operated so as to cool/heat the rooms by recovering air from the rooms with a return unit indicated by an arrow in a direction toward each room and sending the air back to an air blowing system in the gas furnace where the air is to be cooled or heated. In the unitary system, the outdoor unit, the indoor heat exchanger, the auxiliary heat source, and the controller may be from different manufacturers, unlike a duct free system (DFS), such as conventional wall mount and cassette air conditioners. That is, in many cases, each component of the unitary system is installed separately according to user convenience.

In particular, for the thermostat, which is a controller, a product from a manufacturer different from that of the air conditioning system is often employed according to user preference and convenience. As the thermostat controls the system (the outdoor unit, and the gas furnace, for example) using contact signals rather than two-way communication, it is difficult to cope with errors occurring in the system.

As described above, the typical unitary system may generally combine the outdoor unit and the gas furnace to establish a configuration in which the outdoor unit provides cooling and the gas furnace provides heating.

A heat pump of the outdoor unit and the gas furnace may be arranged in parallel to reduce operating costs and use of fossil fuel. Therefore, hybrid systems which save operating costs by performing heating using the heat pump when the outdoor temperature is high and performing heating with the gas furnace when the outdoor temperature is low and a large heating capacity is required are increasingly adopted.

Operation may be switched between the heat pump and the gas furnace based on the outdoor temperature. However, the thermostat does not receive information on the operating state of the outdoor unit or the gas furnace. Accordingly, when any one of the heat pump or the gas furnace fails, heating may not be performed despite that there is the other heating means. Therefore, there is a need for a solution to this issue.

BRIEF DESCRIPTION OF THE DRAWINGS

Embodiments will be described in detail with reference to the following drawings in which like reference numerals refer to like elements, and wherein.

DETAILED DESCRIPTION

Hereinafter, exemplary embodiments disclosed herein will be described in detail with reference to the accompanying drawings. The same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In the following description of embodiments, description of known technology has been omitted to avoid obscuring the subject matter. The accompanying drawings are intended to facilitate understanding of the embodiments disclosed herein, and should not be construed as limiting the technical idea disclosed.

Further, although the drawings are separately described for simplicity, embodiments implemented by combining at least two or more drawings are also within the scope. In addition, when it is stated that an element such as a layer, region or module is "on" another element, it is to be understood that the element may be directly on the other element or there may be intermediate elements between them.

In general, the unitary system widely employed for residential spaces in North America includes a thermostat (temperature control device), an outdoor unit (for cooling or cooling/heating), a gas furnace (for air blowing or heating), and an indoor heat exchanger (an A-coil). The term "thermostat" generally refers to a device that constantly controls the temperature. For example, the thermostat may be controlled by setting a switch in an open position or a closed position using bimetal. Bimetal is a coupling of two different types of thin metal plates with different coefficients of linear expansion. The bimetal may be used to open and close the electrical contact because it makes a gentle curve when the temperature rises. In addition, various kinds of temperature sensors (a thermistor, a thermocouple, a platinum resistance wire, for example) may be employed to detect the temperature and electrically control the opening and closing of the contact. In embodiments disclosed herein, the thermostat may refer to a temperature control device configured to control the temperature of the system by changing a switch between an open position and a closed position.

Figure 1:
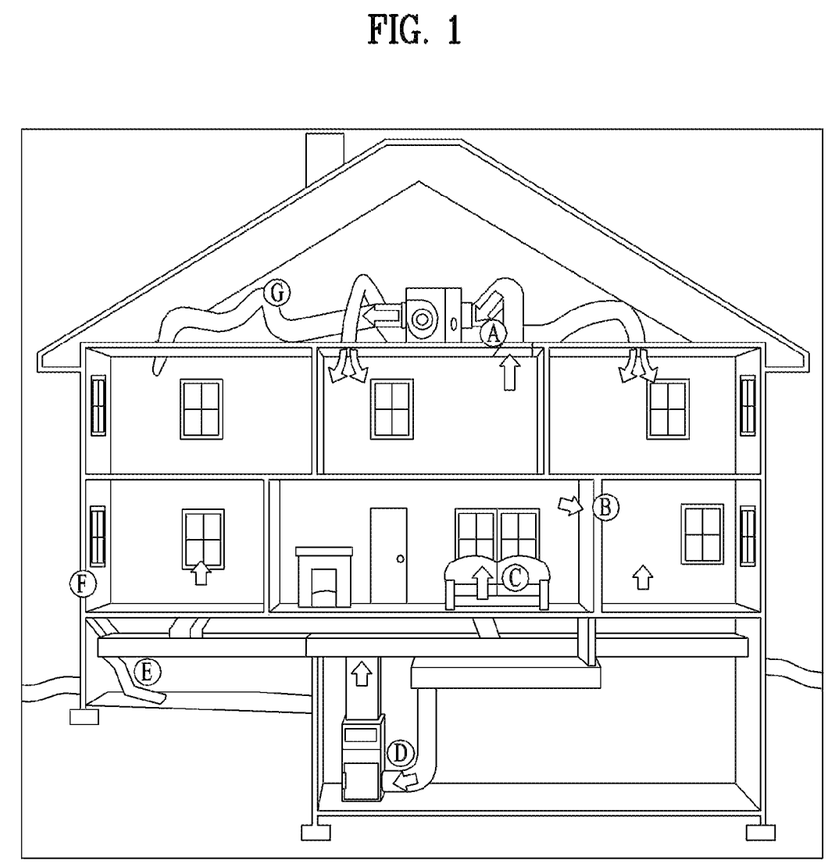
FIG. 1 is a schematic diagram showing installation of a unitary system to which embodiments are applicable.

FIG. 1 is a schematic diagram showing installation of a unitary system to which embodiments are applicable. Referring to FIG. 1, the outdoor unit installed outdoors provides cooling or cooling/heating, and the indoor heat exchanger and gas furnace D are installed indoors in a basement or on the ceiling to transport processed air into an indoor residential space through an air passage called a duct to cool/heat rooms. The unitary system recovers the indoor air through return units, indicated by arrows representing the direction of flow into each room and sends the recovered air back to the a blowing system inside of gas furnace D to cool or heat the air to cool/heat the rooms.

In FIG. 1, components indicated by A and B represent return air diffusers, and may serve to recover indoor air and send the same to the air conditioning system (unitary system). A represents installation on the ceiling and B represents installation on the wall. Components indicated by C, E, and F represent air supply diffusers. The air supply diffusers correspond to components of the air-conditioning system through which air processed by cooling/heating is supplied to the rooms (floor blowing).

Component D represents the indoor heat exchanger (A-coil) and the gas furnace, as mentioned above. The indoor heat exchanger (A_coil) is connected to the outdoor unit (gas furnace) to perform cooling, and the gas furnace takes charge of heating (wherein the gas furnace employs a blower or a fan to transport cooling/heating air).

In FIG. 1, component G represents an air supply duct. In other words, it represents a duct through which air that has been cooled/heated in the air conditioning system is transported.

Figure 2:
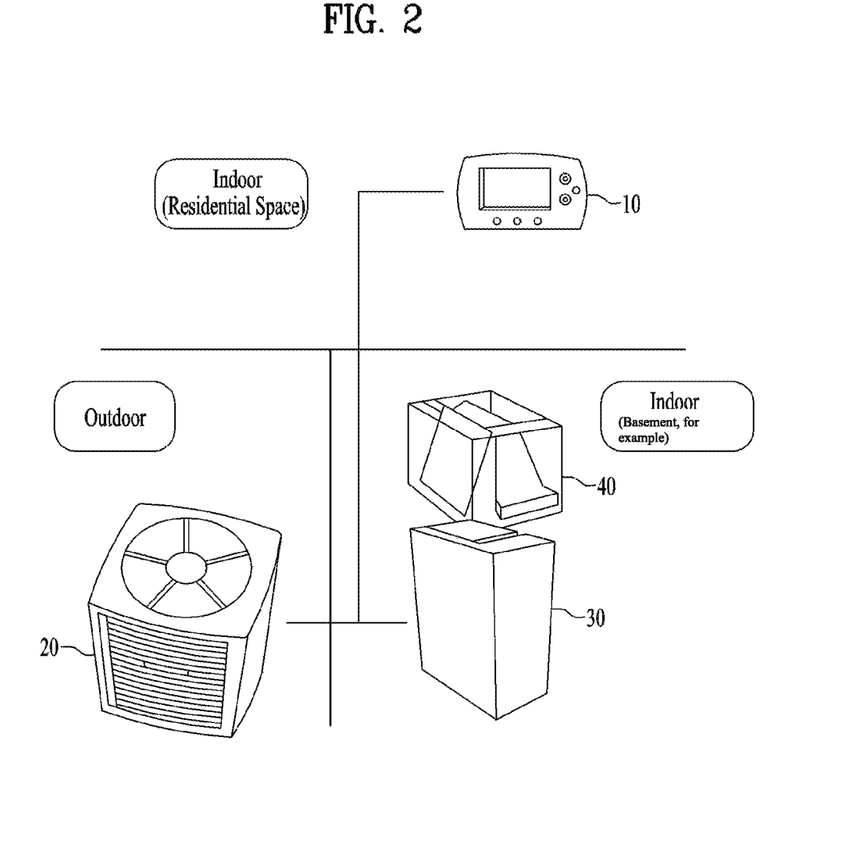
FIG. 2 is a block diagram of a typical unitary system.
Figure 3:
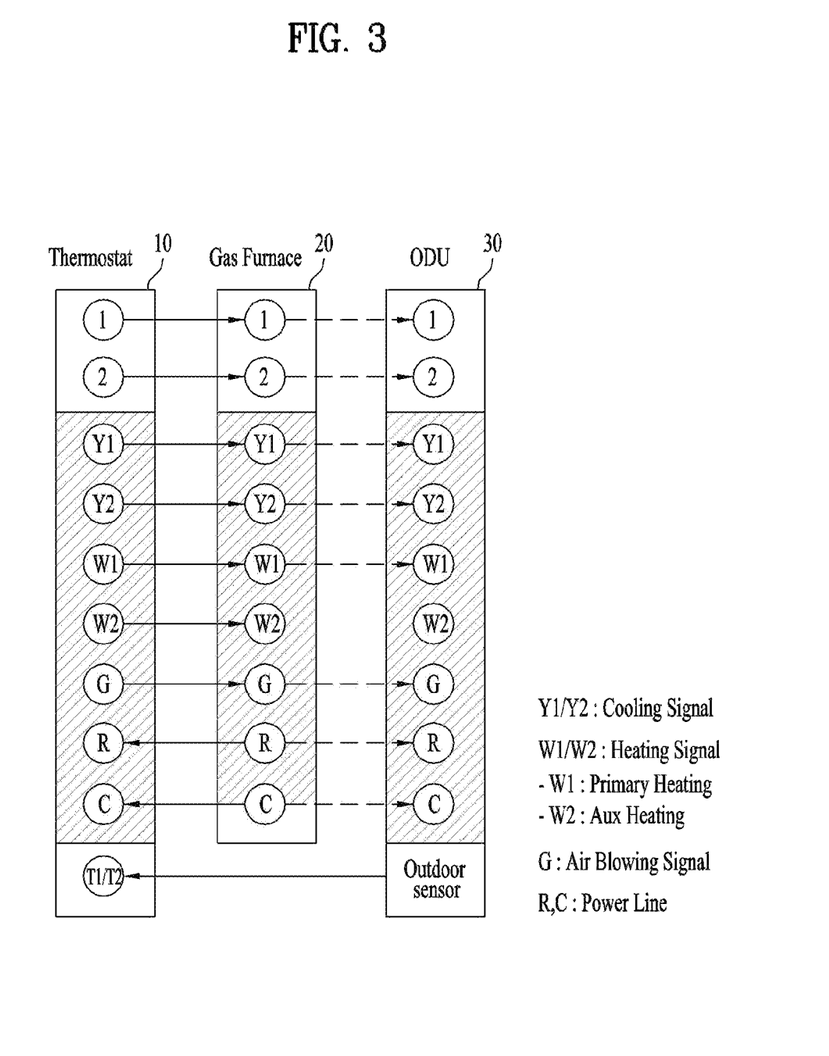
FIG. 3 is a control flowchart of the typical unitary system.

FIG. 2 is a block diagram of a typical unitary system. FIG. 3 is a control flowchart of the typical unitary system.

Referring to FIG. 2, the unitary system includes a thermostat (controller) 10, an outdoor unit (for cooling or cooling/heating) 20, an auxiliary heat source (gas furnace, air blowing/heating) 30, and an indoor heat exchanger (A-coil) 40 as basic elements. In general, unlike the duct free system (DFS) such as a conventional wall mount or cassette air conditioner, the outdoor unit 20, the indoor heat exchanger 40), the auxiliary heat source 30, and the controller 10 included in the unitary system may be from different manufacturers. That is, in many cases, each component of the unitary system is installed separately according to user convenience.

In particular, for the thermostat 10, which is a controller, a product from a manufacturer different from the manufacturer of the air conditioner is employed according to user preference and convenience in many cases. As the thermostat 10 controls the system (outdoor unit, gas furnace, for example) over contact signals rather than two-way communication, as shown in FIG. 3, it is difficult to cope with errors occurring in the system.

The thermostat 10 generally provides signals, such as R, C, Y (or Y1, Y2), W (W1, W2), and G, in order to allow operation in connection with a system (outdoor unit, gas furnace, for example) from a different manufacturer than the air conditioning system. Signals T1 and T2 are received through ports through which the thermostat 10 connects to an external temperature sensor to receive information about the external air temperature (for example, for dual fuel combustion of the outdoor unit and the gas furnace).

In FIG. 3, ① and ② represent independent communication connectors implemented when connected by the same manufacturer. In addition, the shaded parts represent parts that are commonly provided by multiple manufacturers.

As described above, the typical unitary system may generally employ a configuration of a combination of the outdoor unit and the gas furnace in which the outdoor unit provides cooling and the gas furnace provides heating.

As described above, details described with reference to FIGS. 1 to 3 may be applied to an exemplary embodiment. A heat pump outdoor unit and a gas furnace may be installed in parallel to reduce operating costs and use of fossil fuel. Hybrid systems that perform the heating operation using the heat pump when the outdoor temperature is high and using the gas furnace when the outdoor temperature is low and a large heating capacity is required are increasingly employed to reduce the operating costs.

The heat pump and the gas furnace may be switched based on the outdoor temperature. However, the thermostat does not receive information on an operating state of the outdoor unit or the gas furnace. Thus, when any one of the heat pump or the gas furnace fails, heating may not be performed despite that the other heating means is normal.

Figure 4:
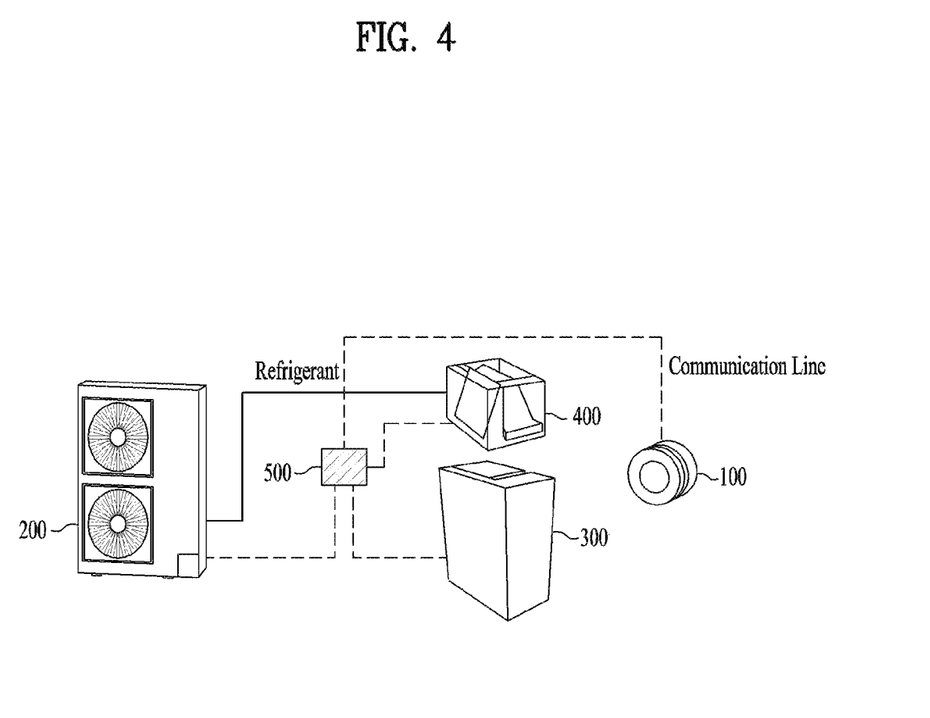
FIG. 4 is a block diagram of an air conditioning system according to an embodiment.

FIG. 4 is a block diagram of an air conditioning system according to an embodiment. Referring to FIG. 4, the air conditioning system according to an embodiment may include an outdoor unit 200, an indoor heat exchanger (indoor unit) 400 connected to the outdoor unit 200, an auxiliary heat source 300, a thermostat 100 configured to control the temperature of an installation space in which the indoor heat exchanger 400 is installed, and a communicator 500 connected therebetween to control driving of the outdoor unit 200 and the auxiliary heat source 300.

The outdoor unit 200 may include a compressor as a component of the air conditioning system that uses a refrigerant. For example, the outdoor unit 200 may be a heat pump.

The heat pump is a cooling/heating device that transfers a low-temperature heat source at a high temperature or a high-temperature heat source at a low temperature using the generated heat or condensation heat of the refrigerant. Heat tends to move from a high-temperature side to a low-temperature side. In contrast, the heat pump may serve to raise heat from a low-temperature side to a high-temperature side.

The indoor heat exchanger 400 including a temperature sensor may be connected to the outdoor unit 200. The indoor heat exchanger 400 may receive a refrigerant from the outdoor unit 200. Heat exchange may occur in the indoor heat exchanger 400 according to a state of the refrigerant. That is, when the refrigerant is supplied at a high temperature, the space in which the indoor heat exchanger 400 is installed may be heated. When the refrigerant is supplied at a low temperature, the space in which the indoor heat exchanger 400 is installed may be cooled.

The auxiliary heat source 300 may be arranged as an auxiliary to the outdoor unit 200 and be operated by an energy source different from that of the outdoor unit 200. For example, the auxiliary heat source 300 may be a furnace that generates heat using fossil fuel. More specifically, the auxiliary heat source 300 may be a gas furnace operated by gas.

The outdoor unit 200 and the auxiliary heat source 300 may be connected to the communicator (Comm. Kit) 500 by a communication line. In FIG. 4, a dotted line may represent the communication line.

The thermostat 100 may control the temperature of the installation space to which cold or warm air is supplied by the outdoor unit 200 and the auxiliary heat source 300. With this configuration, heating may be performed using the outdoor unit 200 when the outdoor temperature is high. When the outdoor temperature is low and a large heating capacity is required, the heating operation may be performed using the auxiliary heat source 300.

That is, as a hybrid system is configured with the outdoor unit 200 and the gas furnace (auxiliary heat source) 300, heating may be performed only with the outdoor unit 200 when the outdoor temperature is high. Thereby, operating costs may be reduced.

The outdoor unit 200 and the auxiliary heat source 300 may be connected to the communicator 500 using different communication schemes. This is because the outdoor unit 200 and the auxiliary heat source 300 may be from different manufacturers as described above.

More specifically, the thermostat 100 and the auxiliary heat source 300 may be connected to the communicator 500 using a first communication scheme, and the outdoor unit 200 may be connected to the communicator 500 using a second communication scheme. The first communication scheme may be communication through a contact signal, and the second communication scheme may be communication through an internal communication protocol.

Figure 5:
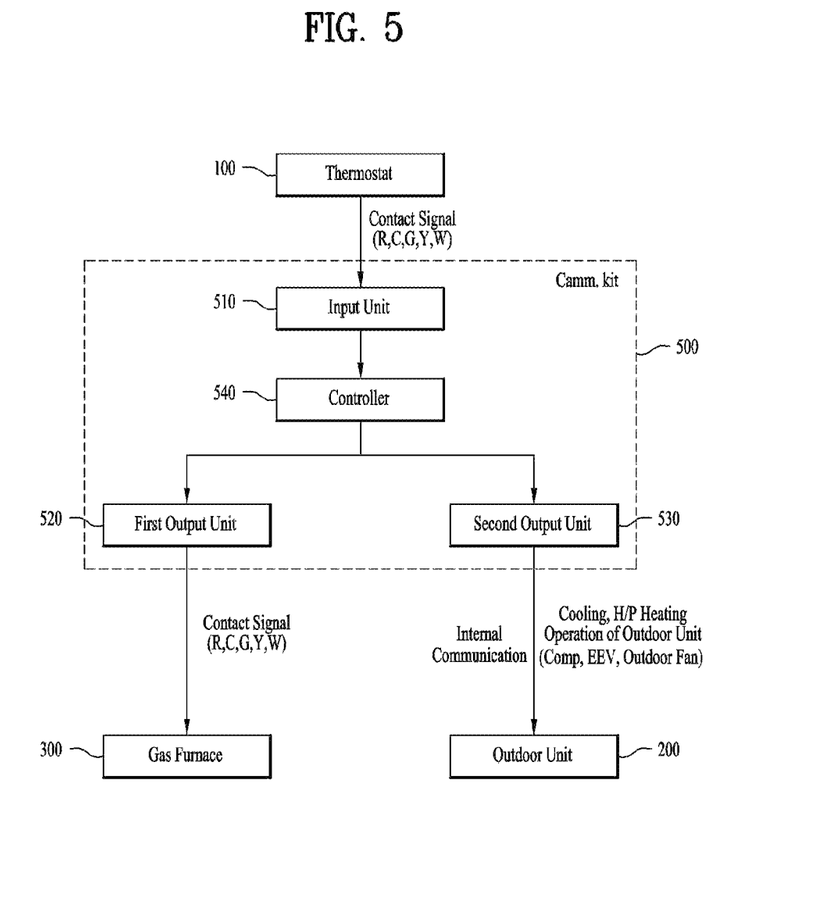
FIG. 5 is a block diagram of the air conditioning system according to an embodiment.

The communicator 500 may have a controller 540 (see FIG. 5). The controller 540 may change and process a first signal according to the first communication scheme and a second signal according to the second communication scheme, which will be described in detail later.

FIG. 5 is a block diagram of the air conditioning system according to an embodiment. FIG. 5 shows a configuration of the communicator 500.

Referring to FIG. 5, the communicator 500 may include an input unit 510, to which the thermostat 100 may be connected. In this case, the communicator 500 and the thermostat 100 may be connected by a communication line. As mentioned above, the communicator 500 and the thermostat 100 may exchange contact signals R, C, G, Y, and W.

As described above with reference to FIG. 3, the thermostat 10 generally provides signals, such as R, C, Y (or Y1, Y2), W (W1, W2), and G, at contact points in order to allow operation in connection with a system (outdoor unit, gas furnace, for example) from a different manufacturer than the air conditioning system. The details shown in FIG. 3 may be applied to this embodiment.

Signals T1 and T2 are received through ports through which the thermostat 10 connects to an external temperature sensor to receive information about the external air temperature (for example, for dual fuel combustion of the outdoor unit 200 and the auxiliary heat source 300).

Among the contact signals, signals R and C are received through ports to which a power line is connected, and signal G is a received through a port configured to receive a blowing signal. Signal Y (Y1, Y2) is received through a port configured to receive a cooling signal, and signal W (W1, W2) is received through a port configured to receive a heat signal. Among these signals, the communicator 500 and the thermostat 100 may exchange contact signals of R, C, G, Y, and W.

The communicator 500 may include a first output unit 520, to which the auxiliary heat source 300 is connected.

The auxiliary heat source 300 and the communicator 500 may exchange contact signals R, C, G, Y, and W. That is, the communicator 500 and the auxiliary heat source 300 may exchange contact signals R, C, G, Y, and W.

In addition, the communicator 500 may include a second output unit 530, to which the outdoor unit 200 is connected. In this case, the communicator 500 and the outdoor unit 200 may exchange signals using an internal communication protocol. Communication such as, for example, RS485 communication.

That is, the communicator 500 and the outdoor unit 200 may be provided by the same manufacturer, and thus, exchange signals using the same communication scheme. By exchanging such signals, operation of the outdoor unit including cooling and heating using a heat pump may be performed. That is, by the exchange of such signals, and driving of the compressor (Comp), driving of the electronic expansion valve (EEV), driving of the outdoor unit fan, for example, may be performed in the outdoor unit 200.

In FIG. 5, the configuration of the indoor heat exchanger 400 is omitted. The indoor heat exchanger 400 may perform a passive function of heat exchange through a flow of refrigerant generated by the outdoor unit 200. For example, the communicator 500 may be installed in the indoor heat exchanger 400 or adjacent to the indoor heat exchanger 400.

With this configuration, the communicator 500 may communicate with the outdoor unit 200 to perform the operation of the outdoor unit 200 described above, and control on/off of the auxiliary heat source 300, and fan speed. In addition, the communicator 500 may detect the temperature of the indoor heat exchanger 400 to perform a control operation to enable efficiently cooling/heating.

Figure 6:
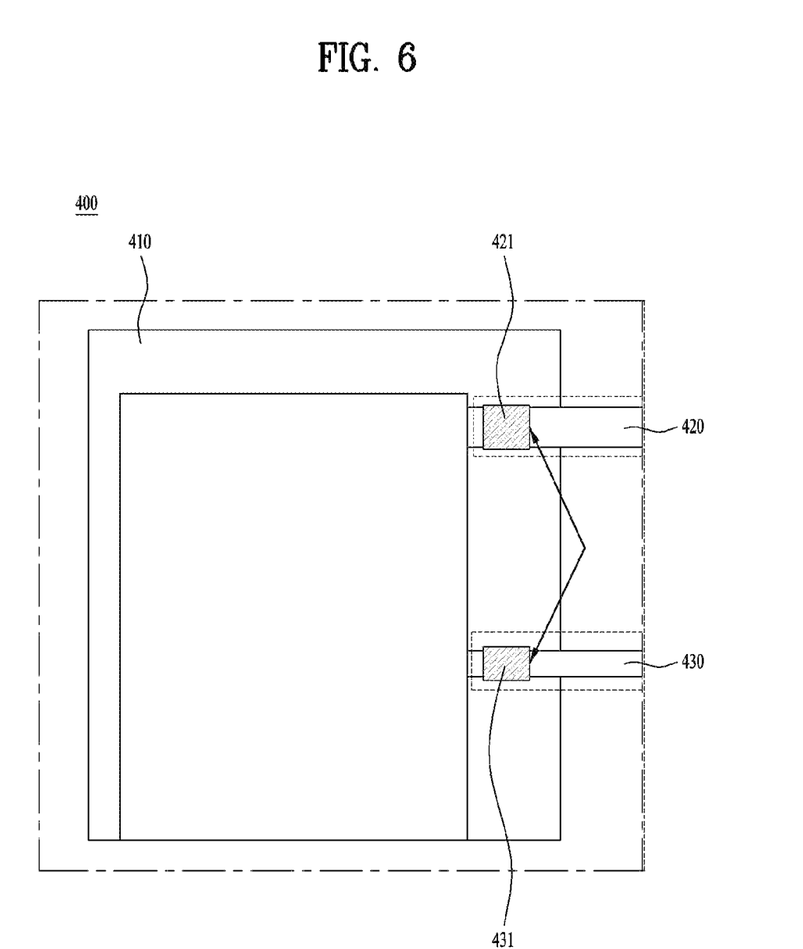
FIG. 6 is a schematic diagram showing an indoor heat exchanger of the air conditioning system according to an embodiment.

FIG. 6 is a schematic diagram showing an indoor heat exchanger of the air conditioning system according to an embodiment. As described above, heat exchange may be performed while the refrigerant supplied from the outdoor unit 200 passes through the indoor heat exchanger 400 (A-coil). The indoor heat exchanger 400 may be provided with a plurality of refrigerant ducts and heat exchange fins. Description of this configuration has been omitted.

As described above, the communicator 500 may detect the indoor temperature through the indoor heat exchanger 400. The indoor heat exchanger 400 may include temperature sensors 421 and 431.

The indoor heat exchanger 400 may include a body 410 and a duct including an inlet duct 420 and an outlet duct 430 for the refrigerant. In this case, the temperature sensors may be duct temperature sensors 421 and 431 installed on the ducts.

The duct temperature sensors may include inlet sensor 421 installed on the inlet duct 420 of the indoor heat exchanger 400 and outlet sensor 431 installed on the outlet duct 430. In this case, the controller 540 installed in the communicator 500 may monitor the operating state of at least one of the outdoor unit 200 or the auxiliary heat source 300 using the duct temperature sensors 421 and 431.

Figure 7:
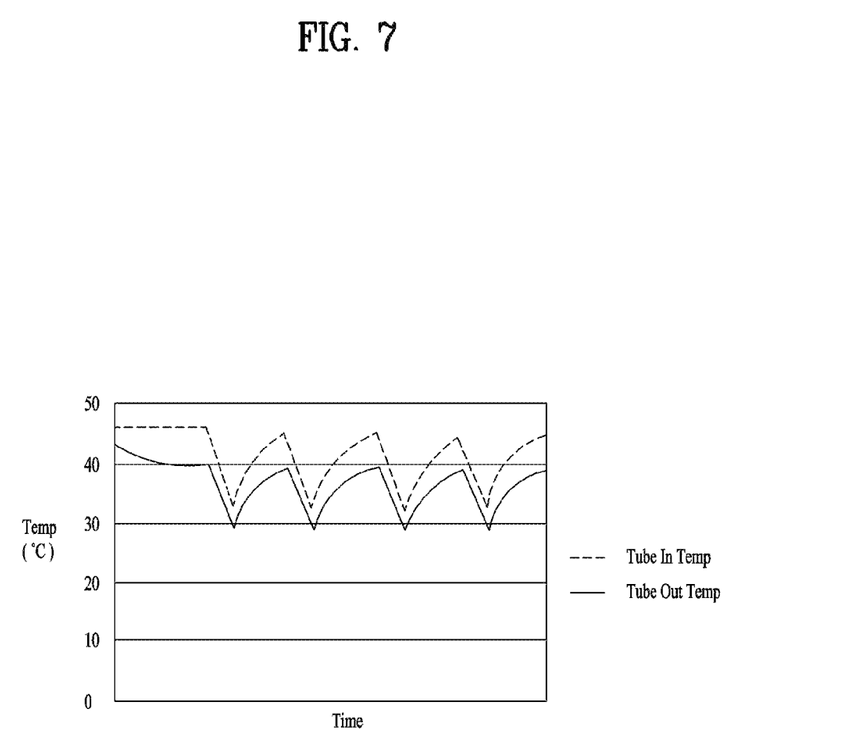
FIG. 7 is a graph depicting a duct temperature monitored using a duct temperature sensor installed in the indoor heat exchanger of the air conditioning system according to an embodiment.

FIG. 7 is a graph depicting a duct temperature monitored using a duct temperature sensor installed in the indoor heat exchanger of the air conditioning system according to an embodiment. As described above, the inlet (Tube In) sensor 421 and the outlet (Tube Out) sensor 431 may be installed in the inlet duct 420 and the outlet duct 430 of the indoor heat exchanger 400. In addition, as an example, the indoor heat exchanger 400 may be disposed near the auxiliary heat source 300.

During a heating operation using the outdoor unit 200, the duct temperature of the indoor heat exchanger 400 increases according to a flow of refrigerant. During a heating operation using the auxiliary heat source 300, the inlet/outlet (Tube In/Tube Out) temperature may rise above a certain temperature due to the air heated by operation of the auxiliary heat source 300.

FIG. 7 shows that the temperature detected by the duct temperature sensors, that is, the inlet (Tube In) sensor 421 and an outlet (Tube Out) sensor 431 changes according to the on/off of the operation of the auxiliary heat source 300. Upon receiving a heating signal for the heating operation from the thermostat 100, the controller 540 may determine whether to use the outdoor unit 200 or the auxiliary heat source 300 for heating based on the outdoor temperature.

In addition, when an error is detected during the heating operation using one of the outdoor unit 200 or the auxiliary heat source 300, the operation may be switched to the heating operation using the other one of the outdoor unit 200 or the auxiliary heat source 300. Determination of such an error or abnormality may be performed based on the temperatures detected by the inlet (Tube In) sensor 421 and the outlet (Tube Out) sensor 431.

For example, when an error is detected in the outdoor unit 200 or the error is maintained for a predetermined time or longer, the operation may be switched to the auxiliary heat source 300. In addition, when the abnormality of the auxiliary heat source 300 is detected or the abnormality is maintained for a predetermined time or longer, the operation may be switched to the outdoor unit 200.

As a specific example, when the error of the outdoor unit 200 is maintained for a predetermined time or longer, or the temperatures detected by the duct temperature sensors 421 and 431 is maintained at or below a first temperature for a predetermined time, the operation may be switched to the auxiliary heat source 300.

In addition, when the temperatures detected by the duct temperature sensors 421 and 431 are maintained at or below the first temperature for a predetermined time during operation of the auxiliary heat source 300, the controller 540 may switch the operation to the outdoor unit 200. Such a control procedure will be described hereinafter.

Figure 8:
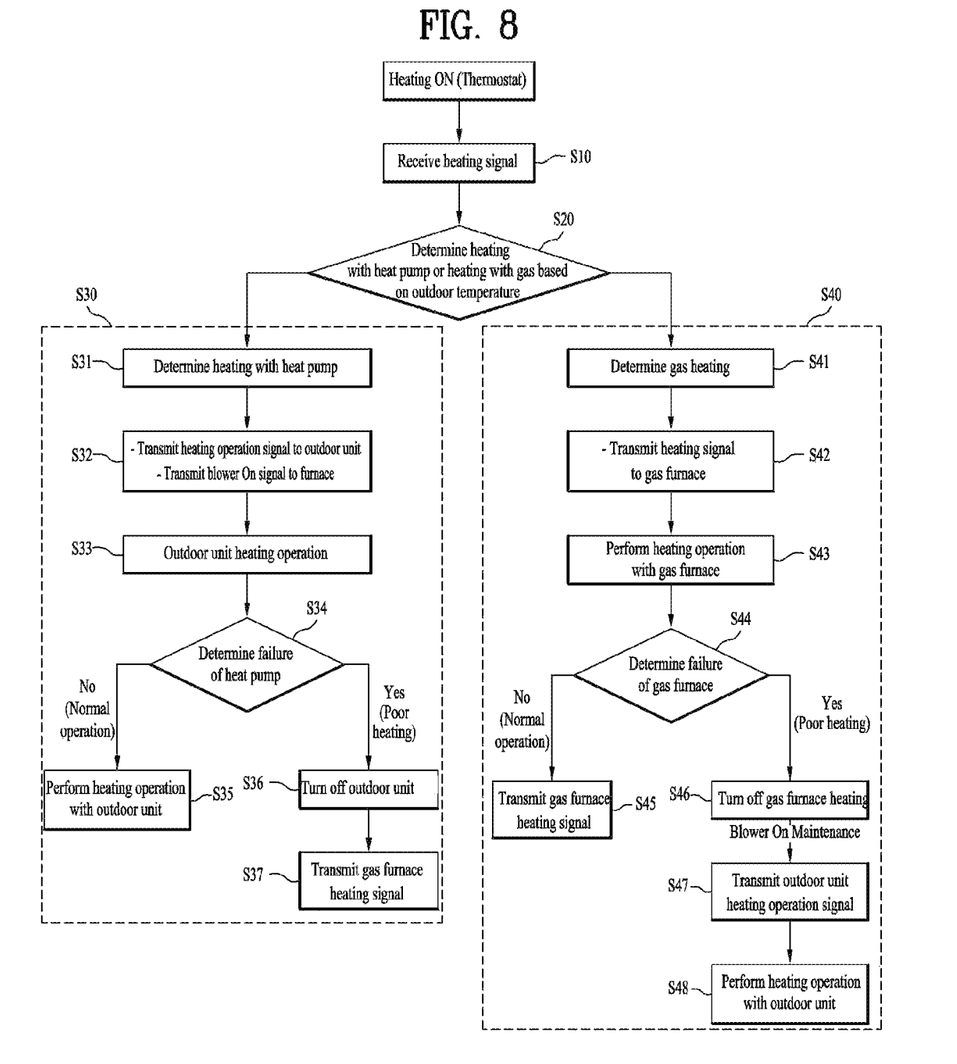
FIG. 8 is a flowchart of a method for controlling an air conditioning system according to an embodiment.

FIG. 8 is a flowchart of a method for controlling an air conditioning system according to an embodiment. Hereinafter, a method using an air conditioning system, such as the air conditioning system described above will be described. The method described herein may be carried out through a communicator, such as communicator 500, in particular, a controller, such as controller 540 installed in the communicator 500.

First, when a heating operation is started, communicator 500 may receive a heating signal from a thermostat, such as thermostat 100 (510). In this case, outdoor temperature information may be received from an outdoor unit, such as outdoor unit 200 as well.

Upon receiving the heating signal, one of a first heating using the outdoor unit 200 and a second heating using an auxiliary heat source, such as auxiliary heat source 300 may be determined based on the outdoor temperature (S20).

When the outdoor temperature is not lower than a reference temperature, the first heating using the outdoor unit 200 may be performed (S30). When the outdoor temperature is lower than the reference temperature, the second heating using the auxiliary heat source 300 may be performed (S40).

For example, when the first heating using the outdoor unit (heat pump) 200 is determined (S31), a heating operation signal may be transmitted to the outdoor unit 200 (S32). In this case, when the first heating is determined (S31), an operation of transmitting a fan operation signal to the auxiliary heat source 300 may be performed (S32). When the heating using the outdoor unit (heat pump) 200 is determined, a high-temperature/high-pressure refrigerant may move to the indoor heat exchanger 400 (A-coil) through a heating operation in the outdoor unit 200. A fan (blower) may be operated to allow the high-temperature/high-pressure refrigerant to perform heating through heat exchange with air in the indoor heat exchanger 400.

The indoor heat exchanger 400 may be provided with only a duct for heat exchange without a fan. Accordingly, a blower (not shown) provided in the auxiliary heat source 300 may be used to transport air. In this case, only the blower may be driven without driving the auxiliary heat source 300, that is, without performing a combustion process.

When an operation signal is transmitted to the outdoor unit 200 (S32) as described above, a heating operation using the outdoor unit 200 may be performed (S33). While the heating operation is being performed, a duct temperature may be monitored through duct temperature sensors, such as duct temperature sensors 421 and 431.

In some cases, an error may occur in the operation of the outdoor unit 200. In this case, whether there is a failure of the outdoor unit (heat pump) 200 may be determined based on at least one of an error signal received from the outdoor unit 200 or a signal received from the duct temperature sensors 421 and 431 (S34).

It may be determined that the outdoor unit 200 has failed when the error of the outdoor unit 200 is maintained for a predetermined time or longer, or the temperature detected by the duct temperature sensors 421 and 431 is maintained at or below a predetermined temperature, for example, a first temperature for a certain or predetermined time. Alternatively, it may be determined that the outdoor unit 200 has failed when the error of the outdoor unit 200 is maintained for a certain or predetermined time or longer, when the temperature detected by the duct temperature sensors 421 and 431 is maintained at or below a certain or predetermined temperature, for example, the first temperature, or when the temperature sensed by the duct temperature sensors 421 and 431 is maintained at or below a second temperature higher than the first temperature for a second time longer than the first time.

For example, when the error of the outdoor unit 200 is maintained for 1 minute or longer, or the duct outlet temperature detected by the duct temperature sensors 421 and 431 is continuously maintained at or below the first temperature for 15 minutes or longer, or the duct outlet temperature detected by the duct temperature sensors 421 and 431 is continuously maintained below the second temperature higher than the first temperature, that is, between the first temperature and the second temperature, for 30 minutes or longer, it may be determined that the outdoor unit 200 has failed.

In the determination operation S34, when it is determined that the outdoor unit 200 has not failed, the heating operation using the outdoor unit 200 may be continued (S35). On the other hand, when it is determined that the outdoor unit 200 has failed in the determination operation S34, the operation of the outdoor unit 200 may be turned off (S36). Then, a heating signal for the heating operation using the auxiliary heat source 300 may be transmitted to the auxiliary heat source 300 (S37).

As another example, when the second heating using the auxiliary heat source (gas furnace) 300 is determined (S41), a heating operation signal may be transmitted to the auxiliary heat source 300 (S42). Once the operation signal is transmitted to the outdoor unit 200 (S42), a heating operation using the auxiliary heat source 300 may be performed (S43).

While the heating operation is being performed, the duct temperature may be monitored through the duct temperature sensors 421 and 431. In some cases, an error may occur in the operation of the auxiliary heat source 300. In this case, whether the auxiliary heat source 300 has failed may be determined based on the signal received from the duct temperature sensors 421 and 431 (S44).

When the temperature detected by the duct temperature sensors 421 and 431 is maintained at or below a certain or predetermined temperature, for example, the first temperature for a certain or predetermined time, it may be determined that the auxiliary heat source 300 has failed. For example, when the duct outlet temperature detected by the duct temperature sensors 421 and 431 is continuously maintained at or below the first temperature for 15 minutes or longer, it may be determined that the auxiliary heat source 300 has failed.

When it is determined that the auxiliary heat source 300 has not failed in the determination operation (S44), the heating operation using the auxiliary heat source 300 may be continued (S45). On the other hand, when it is determined that the auxiliary heat source 300 has failed, the second heating using the auxiliary heat source 300 may be stopped (S46). However, the fan operation signal may be maintained at this time.

Then, a heating signal for heating using the outdoor unit 200 may be transmitted to the outdoor unit 200 (S47). Accordingly, when the auxiliary heat source 300 fails, the heating operation may be performed using the outdoor unit 200 (S48).

As described above, determination of the failure of the outdoor unit 200 or the auxiliary heat source 300 may be performed by the duct temperature sensors 421 and 431 provided in the indoor heat exchanger 400, more specifically outlet sensor 431.

It takes time for the temperature to rise for the heat pump used for the outdoor unit 200, and a temperature higher than or equal to a certain or predetermined temperature, for example, 42° C., should be secured at the outlet sensor 431 in order to supply proper heating. Accordingly, the operation may be performed in two stages as described above.

On the other hand, a temperature forming the basis of determination of a failure during operation of the gas furnace used as the auxiliary heat source 300 may be set to a temperature lower than a reference (second temperature) for a heat pump backup operation because the duct temperature must be increased by air heated by operation of the gas furnace (the temperature at this time may be similar to the temperature of the air supplied to the room).

Figure 9:
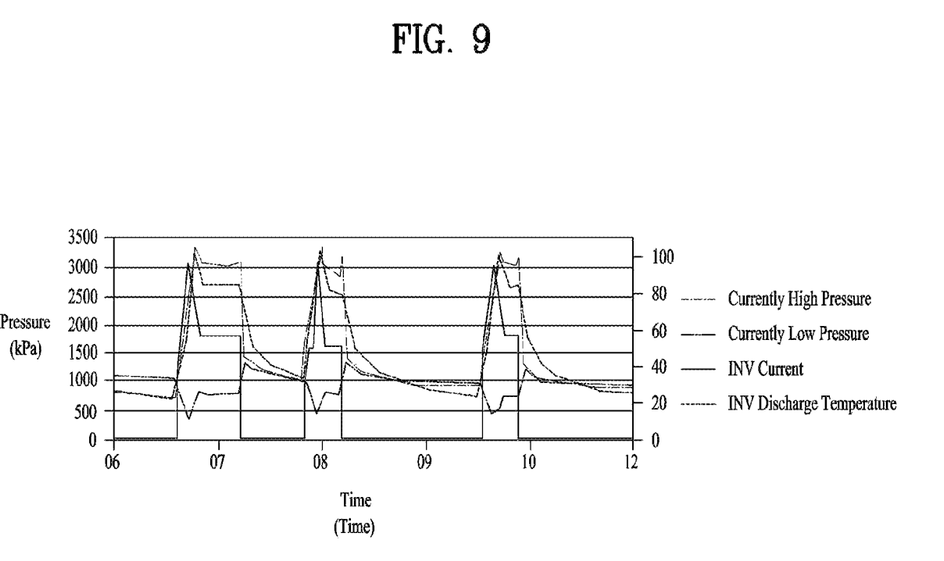
FIGS. 9 and 10 are graphs depicting fluctuations in pressure and temperature of a duct, respectively, during a heating operation performed with the outdoor unit of the air conditioning system according to an embodiment.
Figure 10:
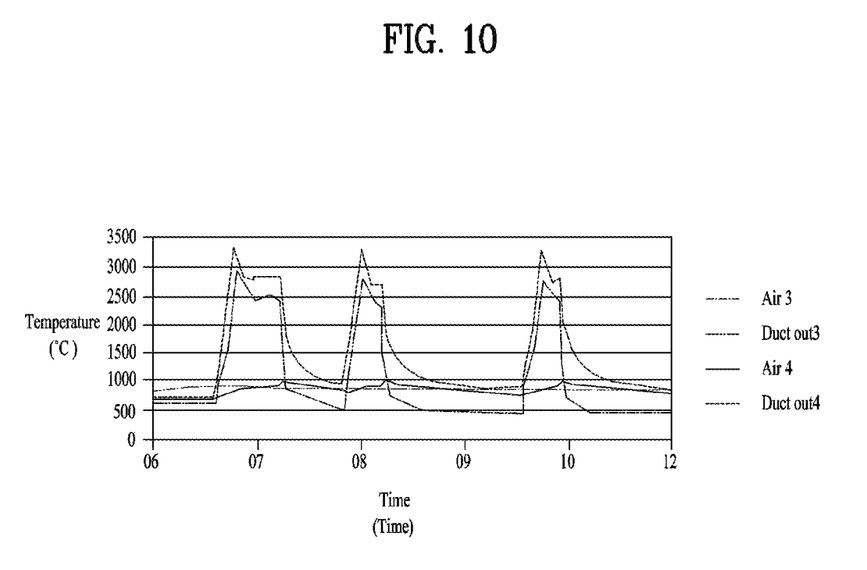

FIGS. 9 and 10 are graphs depicting fluctuations in pressure and temperature of a duct, respectively, during a heating operation performed with the outdoor unit of the air conditioning system according to an embodiment of the present disclosure. In the heating operation performed by the outdoor unit 200, a vapor compression cycle is composed of operations of a compressor, a condenser, an expansion valve (EEV), and an evaporator.

First, in the pressure graph shown in FIG. 9, the high pressure is the pressure of the refrigerant gas discharged from the compressor of the outdoor unit 200 and corresponds to a condensation pressure. The low pressure corresponds to the evaporation pressure.

In FIG. 9, INV stands for an inverter configured to drive a compressor. In addition, INV represents a number of revolutions (frequency in Hz) of the currently operating compressor.

In FIG. 10, Air 3 and Air 4 (FIGS. 9 and 10 show examples of test operation of two systems) represent temperatures of returned air recovered from rooms and introduced into the indoor heat exchanger 400. Duct Out3 and Duct Out4 represent a duct temperature in the indoor heat exchanger 400 in the two systems.

Referring to FIGS. 9 and 10, when a set temperature is reached during operation of the air conditioning system in connection with the thermostat 100, the operation is turned off. Then, when the temperature is lower than the set temperature, the operation is turned on. Thus, the graph shows a behavior that fluctuates periodically.

As described above, according to an embodiment, operations of the thermostat, the outdoor unit, the indoor unit, and the indoor heat exchanger, which are manufactured by different manufacturers, may be efficiently controlled. Further, the operation may be monitored using the duct temperature sensors of the indoor unit to check whether proper heating is performed.

Furthermore, when proper heating cannot be performed due to an issue such as a failure of the outdoor unit or the auxiliary heat source as a result of the monitoring, the operation may be automatically switched to the heat source to maintain heating.

Embodiments disclosed herein provide an air conditioning system capable of efficiently controlling operation of manufactured by different manufacturers and a method for controlling an air conditioning system. Embodiments disclosed herein provide an air conditioning system capable of maintaining heating by automatically switching to another heat source when proper heating cannot be performed due to an issue, such as a failure of an outdoor unit or an auxiliary heat source, and a method for controlling an air conditioning system.

In embodiments disclosed herein, a duct temperature sensor installed in a gas/liquid duct to control an electronic expansion valve (EEV) of an indoor heat exchanger may be provided, and thus, the system may be monitored for proper heating. In addition, a communicator capable of connecting to and controlling the outdoor unit or auxiliary heat source (gas furnace) may be provided. Accordingly, when proper heating is not performed due to an issue, such as a failure of the outdoor unit or auxiliary heat source (gas furnace), the system may perform a back-up operation by automatically switching to another heat source regardless of the heating operation of one of the outdoor temperature-based outdoor unit or the auxiliary heat source (gas furnace), thereby maintaining normal heating.

An air conditioning system according to embodiments disclosed herein may include an outdoor unit, an indoor heat exchanger connected to the outdoor unit, the indoor heat exchanger including a temperature sensor, an auxiliary heat source arranged as an auxiliary to the outdoor unit and operated by an energy source different from an energy source of the outdoor unit, a thermostat configured to control a temperature of an installation space supplied with cold air or warm air by the outdoor unit and the auxiliary heat source, and a communicator including an input unit connected to the thermostat, a first output unit connected to the auxiliary heat source, a second output unit connected to the outdoor unit, and a controller configured to process signals between the input unit, the first output unit, and the second output unit.

The controller may monitor an operating state of at least one of the outdoor unit or the auxiliary heat source using the temperature sensor.

The outdoor unit and the auxiliary heat source may be connected to the communicator using different communication schemes. The thermostat and the auxiliary heat source may be connected to the communicator using a first communication scheme, and the outdoor unit may be connected to the communicator using a second communication scheme. The controller may change and process a first signal according to the first communication scheme and a second signal according to the second communication scheme.

The temperature sensor may be a duct temperature sensor arranged on a duct of the indoor heat exchanger. The duct temperature sensor may include an inlet sensor arranged on an inlet duct of the indoor heat exchanger, and an outlet sensor arranged on an outlet duct of the indoor heat exchanger.

The auxiliary heat source may be a gas furnace. The outdoor unit may be a heat pump.

The controller may switch an operation to the auxiliary heat source when an error is maintained in the outdoor unit for a predetermined time or longer, or when a temperature detected by the duct temperature sensor is maintained to be less than or equal to a first temperature for a predetermined time. The controller may switch an operation to the auxiliary heat source when an error is maintained in the outdoor unit for a predetermined time or longer, when a temperature detected by the duct temperature sensor is maintained to be less than or equal to a first temperature for a first period of time, or when the temperature detected by the duct temperature sensor is maintained between the first temperature and a second temperature higher than the first temperature for a second period of time longer than the first period of time.

The controller may switch an operation of the auxiliary heat source to the outdoor unit when a temperature detected by the duct temperature sensor during operation of the auxiliary heat source is maintained to be less than or equal to a first temperature for a predetermined period of time.

A method for controlling an air conditioning system according to embodiments disclosed herein, the air conditioning system including an outdoor unit, an indoor heat exchanger connected to the outdoor unit and including a temperature sensor, an auxiliary heat source arranged as an auxiliary to the outdoor unit and operated by an energy source different from an energy source of the outdoor unit, and a communicator connected to the outdoor unit, the indoor heat exchanger, and the auxiliary heat source may include receiving a heating signal when a heating operation is started, determining one of a first heating using the outdoor unit or a second heating using the auxiliary heat source, based on an outdoor temperature, transmitting an operation signal to the outdoor unit when the first heating is determined, determining whether the outdoor unit has failed and switching to the second heating when it is determined that the outdoor unit has failed, transmitting an operation signal to the auxiliary heat source when the second heating is determined, and determining whether the auxiliary heat source has failed and switching to the first heating when it is determined that the auxiliary heat source has failed. The method may further include transmitting a fan operation signal to the auxiliary heat source when the first heating is determined. Based on the determination that the auxiliary heat source has failed, the second heating using the auxiliary heat source may be stopped, but the fan operation signal may be maintained.

It may be determined that the outdoor unit has failed when an error is maintained in the outdoor unit for a predetermined time or longer, or when a temperature detected by the duct temperature sensor is maintained to be less than or equal to a first temperature for a predetermined time. It may be determined that the outdoor unit has failed when an error is maintained in the outdoor unit for a predetermined time or longer, when a temperature detected by the duct temperature sensor is maintained to be less than or equal to a first temperature for a first period of time, or when the temperature detected by the duct temperature sensor is maintained between the first temperature and a second temperature higher than the first temperature for a second period of time longer than the first period of time. It may be determined that the auxiliary heat source has failed when a temperature detected by the duct temperature sensor during operation of the auxiliary heat source is maintained to be less than or equal to a first temperature for a predetermined period of time.

It is to be understood that both the general description and the detailed description are exemplary and explanatory and are intended to provide further explanation of the disclosure as claimed.

The above description is merely illustrative of the technical idea, and those of ordinary skill in the art to which embodiments pertains will understand that various modifications and variations can be made without departing from the essential features.

Embodiments are not intended to limit the technical idea, but to explain the technical idea, and the scope is not limited by these embodiments. Those of ordinary skill will understand that the scope is not limited by embodiments explicitly described above, but is inclusive of the claims and equivalents thereto.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioning system, comprising:
    an outdoor unit;
    an indoor heat exchanger connected to the outdoor unit, the indoor heat exchanger comprising a temperature sensor;
    an auxiliary heat source arranged as an auxiliary to the outdoor unit and operated by an energy source different from an energy source of the outdoor unit;
    a thermostat configured to control a temperature of an installation space supplied with cold air or warm air by the outdoor unit and the auxiliary heat source; and
    a communicator that connect a first side of the air conditioning system including the thermostat with a second side of the air conditioning system including the indoor heat exchanger and the auxiliary heat source, the communicator comprising:
        an input unit connected to the thermostat;
        a first output unit connected to the auxiliary heat source;
        a second output unit connected to the outdoor unit; and
        a controller configured to process signals between the input unit, the first output unit, and the second output unit, wherein the controller monitors an operating state of at least one of the outdoor unit or the auxiliary heat source using the temperature sensor, and wherein the outdoor unit and the auxiliary heat source are connected to the communicator using different communication schemes.

2. The air conditioning system of claim 1, wherein the thermostat and the auxiliary heat source are connected to the communicator using a first communication scheme, and the outdoor unit is connected to the communicator using a second communication scheme, wherein the controller changes and processes a first signal according to the first communication scheme and a second signal according to the second communication scheme.

3. The air conditioning system of claim 1, wherein the temperature sensor is a duct temperature sensor arranged on a duct of the indoor heat exchanger.

4. The air conditioning system of claim 3, wherein the duct temperature sensor comprises:
    an inlet sensor arranged on an inlet duct of the indoor heat exchanger; and
    an outlet sensor arranged on an outlet duct of the indoor heat exchanger.

5. The air conditioning system of claim 1, wherein the auxiliary heat source is a gas furnace, and the outdoor unit is a heat pump.

6. The air conditioning system of claim 3, wherein the controller switches an operation to the auxiliary heat source when an error is maintained in the outdoor unit for a predetermined time or longer, or when a temperature detected by the duct temperature sensor is maintained to be less than or equal to a first temperature for a predetermined time.

7. The air conditioning system of claim 3, wherein the controller switches an operation to the auxiliary heat source when an error is maintained in the outdoor unit for a predetermined time or longer, when a temperature detected by the duct temperature sensor is maintained to be less than or equal to a first temperature for a first period of time, or when the temperature detected by the duct temperature sensor is maintained between the first temperature and a second temperature higher than the first temperature for a second period of time longer than the first period of time.

8. The air conditioning system of claim 3, wherein the controller switches an operation of the auxiliary heat source to the outdoor unit when a temperature detected by the duct temperature sensor during operation of the auxiliary heat source is maintained to be less than or equal to a first temperature for a predetermined period of time.

9. A method for controlling an air conditioning system including an outdoor unit, an indoor heat exchanger connected to the outdoor unit and including a temperature sensor, an auxiliary heat source arranged as an auxiliary to the outdoor unit and operated by an energy source different from an energy source of the outdoor unit, and a communicator connected to the outdoor unit, the indoor heat exchanger, and the auxiliary heat source, wherein the communicator connects a first side of the air conditioning system including a thermostat with a second side of the air conditioning system including the indoor heat exchanger and the auxiliary heat source, and wherein the outdoor unit and the auxiliary heat source are connected to the communicator using different communication schemes, the method comprising: receiving a heating signal when a heating operation is started; determining one of a first heating using the outdoor unit or a second heating using the auxiliary heat source, based on an outdoor temperature; transmitting an operation signal to the outdoor unit when the first heating is determined; determining whether the outdoor unit has failed and switching to the second heating when it is determined that the outdoor unit has failed; transmitting an operation signal to the auxiliary heat source when the second heating is determined; and determining whether the auxiliary heat source has failed and switching to the first heating when it is determined that the auxiliary heat source has failed, wherein the temperature sensor is a duct temperature sensor arranged on a duct of the indoor heat exchanger.

10. The method of claim 9, further comprising:
transmitting a fan operation signal to the auxiliary heat source when the first heating is determined.

11. The method of claim 10, wherein, based on a determination that the auxiliary heat source has failed, stopping the second heating using the auxiliary heat source, but maintaining the fan operation signal.

12. The method of claim 9, wherein it is determined that the outdoor unit has failed when an error is maintained in the outdoor unit for a predetermined time or longer, or when a temperature detected by the duct temperature sensor is maintained to be less than or equal to a first temperature for a predetermined time.

13. The method of claim 9, wherein it is determined that the outdoor unit has failed when an error is maintained in the outdoor unit for a predetermined time or longer, when a temperature detected by the duct temperature sensor is maintained to be less than or equal to a first temperature for a first period of time, or when the temperature detected by the duct temperature sensor is maintained between the first temperature and a second temperature higher than the first temperature for a second period of time longer than the first period of time.

14. The method of claim 9, wherein it is determined that the auxiliary heat source has failed when a temperature detected by the duct temperature sensor during operation of the auxiliary heat source is maintained to be less than or equal to a first temperature for a predetermined period of time.

15. An air conditioning system, comprising:
an outdoor unit;
an indoor heat exchanger connected to the outdoor unit, the indoor heat exchanger comprising a temperature sensor;
a gas furnace operated by an energy source different from an energy source of the outdoor unit;
a thermostat configured to control a temperature of an installation space supplied with cold air or warm air by the outdoor unit and the gas furnace; and
a communicator that connects a first side of the air conditioning system including the thermostat with a second side of the air conditioning system including the indoor heat exchanger and the gas furnace, the communicator comprising:
an input unit connected to the thermostat;
a first output unit connected to the gas furnace;
a second output unit connected to the outdoor unit; and
a controller configured to process signals between the input unit, the first output unit, and the second output unit, wherein the controller monitors an operating state of at least one of the outdoor unit or the gas furnace using the temperature sensor, and wherein the controller switches an operation to the gas furnace when an error is maintained in the outdoor unit for a predetermined time or longer, or when a temperature detected by the temperature sensor is maintained to be less than or equal to a first temperature for a predetermined time, wherein the outdoor unit and the gas furnace are connected to the communicator using different communication schemes.

16. The air conditioning system of claim 15, wherein the thermostat and the gas furnace are connected to the communicator using a first communication scheme, and the outdoor unit is connected to the communicator using a second communication scheme, wherein the controller changes and processes a first signal according to the first communication scheme and a second signal according to the second communication scheme.

17. The air conditioning system of claim 15, wherein the temperature sensor is a duct temperature sensor arranged on a duct of the indoor heat exchanger.

18. The air conditioning system of claim 15, wherein the controller switches an operation to the gas furnace when an error is maintained in the outdoor unit for a predetermined time or longer, when a temperature detected by the temperature sensor is maintained to be less than or equal to a first temperature for a first period of time, or when the temperature detected by the temperature sensor is maintained between the first temperature and a second temperature higher than the first temperature for a second period of time longer than the first period of time, and wherein the controller switches an operation of the gas furnace to the outdoor unit when a temperature detected by the temperature sensor during operation of the gas furnace is maintained to be less than or equal to a third temperature for a predetermined period of time.

* * * * *